Jan. 17, 1950  H. L. ANDERSON ET AL  2,494,641
RADIATION COUNTER
Filed April 12, 1945
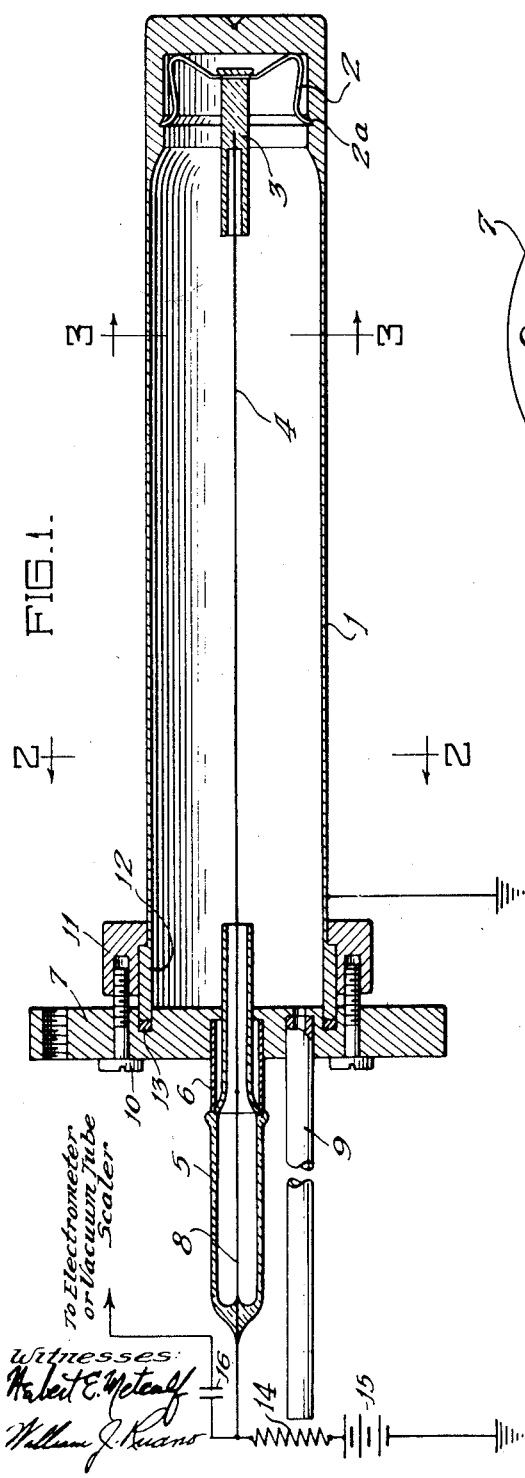
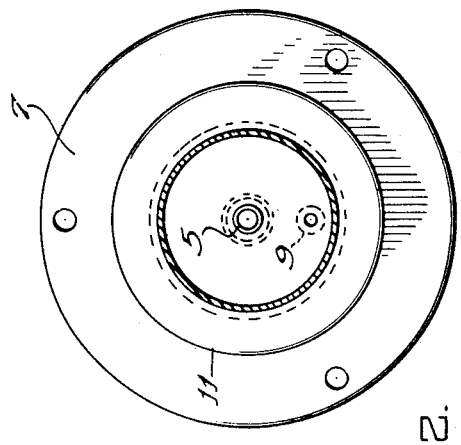
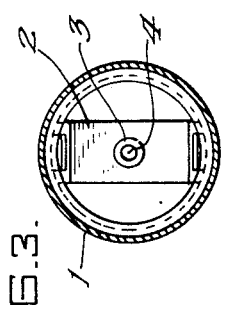
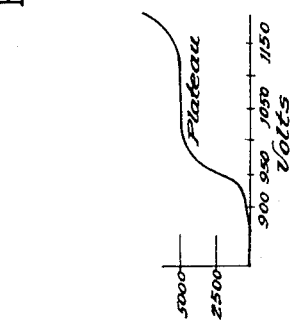
Inventors
Herbert L. Anderson
Philip G. Koontz
By Robert A. Lavender
Attorney Patented Jan. 17, 1950

2,494,641

UNITED STATES PATENT OFFICE 2,494,641

RADIATION COUNTER

Herbert L. Anderson, Hartford, Conn., and Philip G. Koontz, Fort Collins, Colo., assignors to the United States of America as represented by the United States Atomic Energy Commission Application April 12, 1945, Serial No. 588,053

16 Claims. (Cl. 250—27.5)

Our invention relates to a beta ray counter and, more specifically, to improvements in beta ray counters of the Geiger-Müller type that considerably enhance the reproducibility of measurements, and efficiency of detection of beta rays, and permit absolute calibration of the counter.

In the past, beta ray counters, such as Geiger-Müller counters, have been made in the form of a thin glass tube having an internal metallic coating serving as the cathode, and a wire inside and substantially coaxial with the tube serving as the anode. In the process of manufacture of such a tube, when the glass tube is drawn out to form a thin wall for defining the counter chamber, the process invariably results in a cylinder of varying diameter and varying wall thickness along its effective longitudinal length, that is, the tube is thinnest near the center and becomes gradually thicker towards both ends of the tube. Under such circumstances the desired intimate contact between a radioactive foil, such as an indium foil, generally slipped around the tube, and the tube is impossible, and irregularities in the beta ray penetration are caused by even slight wrinklings of the foil. For the same reason, irregularities in beta ray penetration takes place because of the variation of the tube wall thickness along the effective length of the tube. Hence, in the use of such counters in the past, it has been found necessary to place and replace the foils in exactly the same position around the tube in order to secure satisfactory results. Such a requirement has not only given rise to considerable difficulty and inconvenience in taking readings, but has introduced errors, making the readings inaccurate and unreliable in many instances. Furthermore, tube irregularities have made absolute calibration of the counter almost impossible in cases demanding high accuracy.

An object of our invention is to provide a beta ray counter that is substantially devoid of all the above-mentioned objections inherent in glass walled counters.

Another object of our invention is to substantially increase the reproducibility of measurements and the efficiency of detection of beta rays by a beta ray counter, in order to permit the absolute calibration thereof.

Another object of our invention is to provide a beta ray counter of such construction as to facilitate the slipping over and removal of a radioactive foil, and to avoid the necessity of accurate placement of the foil.

Another object of our invention is to provide an efficient beta ray counter of simple and rugged construction that is substantially devoid of the hazard of high voltage shock to operating personnel.

Other objects and advantages will become apparent from the study of the following description together with the drawing, wherein:

Fig. 1 is a longitudinal sectional view of a beta ray counter embodying our invention;

Fig. 2 is a cross-sectional view taken along line 2—2 of Fig. 1 showing part of the structure in elevation;

Fig. 3 is a cross-sectional view taken along line 3—3 of Fig. 1, showing portions of the structure in elevation; and Fig. 4 is a graph showing counts observed plotted versus voltage applied across the electrode of a beta ray counter.

Referring to the drawing, numeral 1 denotes a substantially cup-shaped cylindrical tube of a metal such, for example, as duraluminum or aluminum, or some other structural material having low absorption for beta rays. Tube 1 serves as the cathode and is uniformly thin peripherally as well as longitudinally along its effective length to minimize and equalize beta ray absorption. Such effective longitudinal length may be, for example, 4 inches or more. The wall thickness of tube 1 may be of the order of 0.004 inch and a suitable tube diameter may be about ⅞ inch. Hence the tube wall presents to beta rays a wall of constant absorption characteristics. As long as the radioactive foil, such as an indium foil (not shown), that is slipped over and around the tube wall, is placed within the effective length of the tube, the beta ray absorption is unchanged and the effect upon the counter is the same and is independent of position. Furthermore, the external tube diameter is uniform throughout its entire length, thus allowing the slipping on and removal of the radioactive foil without distorting it, thereby eliminating the introduction of undesirable foil irregularities affecting the beta ray absorption. At the end of the tube opposite a base plate 7, hereinafter referred to as the top end of the tube, the tube walls are substantially thickened and have a curved internal sectional approach to the thick portions to provide reinforcement for that end of the tube so as to prevent collapse of the tube on evacuation. The outer diameter of tube 1 is maintained constant throughout the effective length of the tube.

A spring clip 2 of phosphor bronze or other suitable material, is held in place under spring tension of said clip in an internal groove 2a in the top portion of tube 1 and may be in the form of a bent rectangular strip as appears in Fig. 1. Clip 2 firmly holds in place, centrally thereof, an insulating holder 3 of Pyrex or glass, for example, that supports one end of axial wire 4 of Kovar, for example, constituting the anode. Wire 4 may be, for example, .004 inch in diameter. The other end of anode 4 is supported by a lead-in 8 of Kovar, for example, sealed to a glass tubular insulator 5. Insulator 5 is sealed to a cylindrical member 6, of Kovar, for example, the latter being soldered or otherwise sealed to the base plate 7 which may be made of brass, for example. Thus the anode 4 is held substantially coaxial with tube 1. The lead-in wire 8, forming an extension of the anode and to which a high potential is customarily applied, is located at the base plate end of the tube and is therefore spaced away from the top portion of the tube 1. The radioactive foil is customarily applied or removed over the top portion of the tube and thus the operator is protected from the danger of touching parts energized by high potential. The lead-in wire 8 can be centered when sealed to insulator 5 and may be placed under tension during sealing to place the stress of spring 2 on anode 4. Thus anode 4 is accurately positioned and stressed. Tube 1 may be grounded as indicated. Aluminum alloy counters have plateaus of about 160 to 200 volts with a slope of about 0.035% ±0.005% per volt.

A tube 9 of copper, for example, is also integrally sealed to closure or base member 7. After member 6 and tube 9 are sealed to base member 7, and after anode 4 and its supporting parts are in place, the tube 1 is sealed to closure member 7 by screwing a plurality of machine screws 10 into corresponding threaded holes formed in an annulus 11 of brass, for example, causing an internal shoulder of annulus 11 to press against an abutting sleeve portion 12 integrally secured to the end portion of tube 1. This pressure causes sleeve portion 12 to compress a washer or gasket 13 of neoprene or other suitable sealing material to form a pressure tight or vacuum tight seal for tube 1.

After the chamber defined by tube 1 and base member 7 is sealed, air is exhausted therefrom through tube 9 and the chamber is filled with an ionizable medium, for example a mixture of one part alcohol vapor or other suitable organic vapor, to 9 parts argon at a total pressure of about 12 cm. mercury, also through tube 9. Tube 9 is then closed as by crushing and sealing by soldering or in any other suitable manner. The alcohol acts as a quenching agent and the argon as the principal ionizing medium. Ethanol or isopropanol may be used in place of the alcohol.

A high resistance 14 and source of high potential 15 and condenser 16 are connected in an electrical circuit involving anode 4 and cathode 1 for operation as a Geiger-Müller counter. Since the specific circuit forms no part of the present invention, a brief description of the counter circuit and its operation will be sufficient.

Both anode 4 and cathode 1, as is the case with all other conductors, contain electrons, some of which can be extracted in various ways. If these electrons are for some reason pulled into the gaseous atmosphere in tube 1, they will ionize by collision and a continuous discharge will result, maintained by fresh electrons from the metal. There are various reasons for the attraction of electrons from metal to gas. One reason is the fact that in the process of recombination that is always taking place, light, i. e. a number of photons, is emitted, causing emission of photoelectrons from the inner surface of tube 1 and these photoelectrons can keep the discharge going. It is believed that alcohol, ethanol or isopropanol, by forming a layer on such inner surface of the tube, considerably reduces such photoelectronic emission and, as such, acts as a quenching agent. A second reason is that positive ions, at the moment before they make contact with a metal, exert a great outward force on electrons in the metal and may pull out several electrons before being themselves absorbed by the metal. The nature of the surface has an effect on the number of electrons pulled out, no matter how the actual ejection is produced. A sufficiently high field is applied between the electrodes, that is, one just below the discharge point, as by a high potential source indicated by battery 15, so that electrons introduced through the tube walls will cause a discharge that will continue so long as sufficient voltage is maintained across the electrodes. In other words, the electrons introduced by the radioactive foil act as a trigger that sets off a latent discharge. However, since the current resulting from the discharge flows through a high resistance 14, of the order of $10^9$ ohms (if only argon is used), in the return to the high voltage, as shown in Fig. 1, it sets up a fall of potential across resistance 14 that greatly reduces the potential across electrodes 1 and 4 and shortly extinguishes the discharge. The counter then gradually resumes its former condition of high tension, and is ready to discharge on the arrival of a second electron. This automatic charging is not infinitely rapid, if only argon is used, and a counter employing a large series resistance will take a relatively long time to recover after it has operated, and so it will count slowly. In order to increase the recovery rate, the alcohol, ethanol, isopropanol or other suitable quenching agent is introduced into the argon, aiding resistance 14 in quenching the discharge. Therefore, resistance 14 may be made smaller, for example about 2 megohms, and with the aid of the alcohol vapor will effectively quench the discharge. In making resistance 14 smaller, a quicker recovery rate is obtainable and the counter is rendered more quickly responsive, that is, it is considered as a "fast" counter instead of a "slow" counter as when argon is used alone. Such changes of potential across resistance 14 may vary between a few volts and a few hundred volts and may be detected directly by a cathode ray oscilloscope, for example, or they may be converted into a current pulse by means of a vacuum tube amplifier and detected and counted by a counting circuit or scaler (not shown).

Thus we have provided an improved beta ray counter having a uniformly thin wall disposed in the form of a constant diameter tube, and having a thick walled end portion to form an integral, homogeneous chamber wall adapted to withstand high pressures on evacuation, and having a novel anode supporting structure, as well as a lead-in arrangement that will not expose an operator to high voltages. Furthermore, we have provided a beta ray counter of simple and rugged construction that is easy to use and that produces highly reproducible measurements and is efficient in detecting beta rays.

It will be apparent that the above-described embodiment and the theory presented are merely illustrative and not limiting insofar as our invention is concerned, and that modifications will be readily suggested to those skilled in the art after having had the benefit of the teachings of our invention. Our invention, therefore, should not be limited except insofar as set forth in the following claims.

We claim:

1. A device for indicating the intensity of beta rays, comprising a cathode in the form of a thin walled envelope of material of low absorption for beta rays, and of uniform outer thickness and uniform diameter throughout substantially its entire length, and an anode and ionizable medium contained in said envelope, wherein the cathode is a unitary cup-shaped member having a thickened wall portion adjacent to the closed end thereof.

2. A device for indicating the intensity of beta rays, comprising a cathode in the form of a thin walled envelope of material of low absorption for beta rays, and of uniform thickness and uniform diameter throughout substantially its entire length, an end portion of said envelope having a thicker wall portion but having the same outer diameter as the remainder of the envelope, and an anode and ionizable medium contained in said envelope.

3. A beta ray counter of the Geiger-Müller type comprising, in combination, base end closure means, a metallic cup-shaped envelope sealed to said base end closure means and being of uniform outer diameter from the envelope portion adjacent to said base end closure means to the opposite top end portion of said envelope, and constituting a cathode, an ionizable medium in said envelope, an anode disposed interiorly of said envelope, and support means for said anode in the base end closure means and in said top end portion of the envelope.

4. Apparatus recited in claim 2 together with anode supporting means lodged in the interior of said top end portion.

5. Apparatus recited in claim 3 wherein the cylindrical wall at the top end portion of said envelope is substantially thicker but has the same external diameter as that throughout the length of said envelope.

6. Apparatus recited in claim 3 wherein the cylindrical wall at the top end portion of said envelope is substantially thicker than the remainder of the envelope, said increase in thickness being gradual.

7. Apparatus recited in claim 1, wherein said envelope comprises duraluminum.

8. Apparatus recited in claim 1 wherein said envelope comprises aluminum.

9. A beta ray counter of the Geiger-Müller type comprising, in combination, a substantially cup-shaped cylindrical metallic envelope comprising a cathode, an anode disposed interiorly of said envelope, an ionizable medium in said envelope, an end portion of said envelope having a thickened cylindrical wall portion, said end portion having an internal groove, and a spring clip having portions lodged in said groove under tension of the spring clip, and an anode supporting insulator secured to said spring clip.

10. A beta ray counter of the Geiger-Müller type comprising, in combination, a substantially cylindrical metallic envelope comprising a cathode, an anode disposed interiorly of said envelope, an ionizable medium in said envelope, an end portion of said envelope having a thickened wall portion, said end portion having an internal groove, and a spring clip comprising a flat strip of metal bent to provide a central protruding portion, and a bulbous insulator rigidly secured to said central portion for supporting said anode.

11. Apparatus recited in claim 3 wherein said base end closure means comprises an end plate having sealing means lodged in a circular groove to one face thereof, a thickened ring portion forming an extension of said tube and fitting into said circular groove, said ring portion providing an annular radially outwardly extending shoulder, an annulus having an internal flange in abutting relationship with said shoulder, and a plurality of bolts extending through said end plate and into screw threaded engagement with corresponding screw threaded holes in said annulus to cause said annulus to drive said ring portion into said circular groove to compress said sealing means and effect a gas tight seal for said envelope.

12. Apparatus recited in claim 1 wherein said gaseous medium comprises isopropanol and argon in the ratio of about 1 part to 9, respectively.

13. In a radiation counter, in combination, a cup-shaped cylindrical cathode having an internal groove adjacent the closed end, a closure member sealed to the open end, an insulating fixed anode support member in the closure member, an inwardly bowed spring member having ends resting in the groove, an insulating anode support member mounted centrally of the spring member, and an anode wire supported axially of the cathode by said anode support members.

14. In a radiation counter, in combination, a cylindrical cathode having an internal groove adjacent one end, a closure member sealed to the opposite end, an insulating fixed anode support member in the closure member, an inwardly bowed spring member having ends resting in the groove, an insulating anode support member mounted centrally of the spring member, and an anode wire supported axially of the cathode by said anode support members.

15. In a radiation counter, in combination, a cup-shaped cylindrical cathode, a closure member sealed to the open end, an insulating fixed anode support member in the closure member, a spring member mounted in the closed end of the cathode, an insulating anode support member mounted on the spring member, and an anode wire supported axially of the cathode by said anode support members.

16. In a radiation counter, in combination, a cylindrical cathode having an internal groove adjacent one end, an insulating fixed anode support member in the opposite end, an inwardly bowed spring member having ends resting in the groove, an insulating anode support member mounted centrally of the spring member, and an anode wire supported axially of the cathode by said anode support members.

HERBERT L. ANDERSON.
PHILIP G. KOONTZ.

REFERENCES CITED

The following references are of record in the file of this patent:

UNITED STATES PATENTS

| Number | Name | Date |
| --- | --- | --- |
| 1,933,063 | Kolhorster | Oct. 31, 1933 |
| 2,222,450 | Trost | Nov. 19, 1940 |
| 2,298,950 | Litton | Oct. 13, 1942 |

OTHER REFERENCES

Strong, Procedures in Experimental Physics, 1942 edition, pp. 261, 262 and 267.